(12) United States Patent
Tanaka (10) Patent No.: US 8,822,908 B2
(45) Date of Patent: Sep. 2, 2014

(54) IMAGE SCANNER, IMAGE FORMING APPARATUS AND DEW-CONDENSATION DETERMINATION METHOD

(75) Inventor: Kei Tanaka, Osaka (JP)

(73) Assignee: Kyocera Document Solutions Inc. (JP)

( * ) Notice: Subject to any disclaimer, the term of this patent is extended or adjusted under 35 U.S.C. 154(b) by 338 days.

(21) Appl. No.: 13/483,110

(22) Filed: May 30, 2012

(65) Prior Publication Data

US 2013/0001400 A1   Jan. 3, 2013

(30) Foreign Application Priority Data

Jun. 29, 2011 (JP) ................................. 2011-144200

(51) Int. Cl.
| | |
|---|---|
| *H01J 3/14* | (2006.01) |
| *H01J 5/16* | (2006.01) |
| *H01J 40/14* | (2006.01) |
| *H04N 1/00* | (2006.01) |
| *G02B 26/10* | (2006.01) |
| *H04N 1/409* | (2006.01) |

(52) U.S. Cl.
CPC ............ *G02B 26/10* (2013.01); *H04N 1/00026* (2013.01); *H04N 1/00992* (2013.01); *H04N 1/4097* (2013.01)
USPC ............................ 250/234; 358/505; 358/474

(58) Field of Classification Search
USPC ......... 250/234, 559.06, 559.48; 358/505, 474
See application file for complete search history.

(56) References Cited

U.S. PATENT DOCUMENTS

| | | | |
|---|---|---|---|
| 6,323,933 B1 | 11/2001 | Anzai | |
| 8,699,104 B2 * | 4/2014 | Shimatani | ...................... 358/505 |
| 2008/0025751 A1 * | 1/2008 | Andoh et al. | ................... 399/94 |

FOREIGN PATENT DOCUMENTS

| | | |
|---|---|---|
| JP | 60-192454 | 9/1985 |
| JP | 63-314964 | 12/1988 |

\* cited by examiner

*Primary Examiner* — Francis M Legasse, Jr.
(74) *Attorney, Agent, or Firm* — Gerald E. Hespos; Michael J. Porco; Matthew T. Hespos (57) ABSTRACT

The present disclosure relates to a technique for, in an image scanner and an image forming apparatus equipped with the image scanner, detecting that dew condensation occurs on a transparent member for placing a document thereon.

18 Claims, 8 Drawing Sheets

| PIXEL | 1 | 2 | 3 | ... | n-1 | n |
|---|---|---|---|---|---|---|
| DEW-CONDENSATION DETERMINATION DATA C | C(1) | C(2) | C(3) | ... | C(n-1) | C(n) |
| BLACK REFERENCE DATA B | B(1) | B(2) | B(3) | ... | B(n-1) | B(n) |
| DEW-CONDENSATION DETERMINATION CORRECTED DATA C' | C'(1)=C(1)-B(1) | C'(2)=C(2)-B(2) | C'(3)=C(3)-B(3) | ... | C'(n-1)=C(n-1)-B(n-1) | C'(n)=C(n)-B(n) |

FIG.5B

| PIXEL | 1 | 2 | 3 | ... | n-1 | n |
|---|---|---|---|---|---|---|
| WHITE REFERENCE DATA W | W(1) | W(2) | W(3) | ... | W(n-1) | W(n) |
| BLACK REFERENCE DATA B | B(1) | B(2) | B(3) | ... | B(n-1) | B(n) |
| WHITE-CORRECTED DATA W' | W'(1)=W(1)-B(1) | W'(2)=W(2)-B(2) | W'(3)=W(3)-B(3) | ... | W'(n-1)=W(n-1)-B(n-1) | W'(n)=W(n)-B(n) |

FIG.5C

| PIXEL | 1 | 2 | 3 | ... | n-1 | n |
|---|---|---|---|---|---|---|
| DOCUMENT IMAGE DATA D | D(1) | D(2) | D(3) | ... | D(n-1) | D(n) |
| BLACK REFERENCE DATA B | B(1) | B(2) | B(3) | ... | B(n-1) | B(n) |
| DOCUMENT CORRECTED DATA D' | D'(1)=D(1)-B(1) | D'(2)=D(2)-B(2) | D'(3)=D(3)-B(3) | ... | D'(n-1)=D(n-1)-B(n-1) | D'(n)=D(n)-B(n) |
| SHADING-CORRECTED DOCUMENT DATA D'' | D''(1)=255×D'(1)/W'(1) | D''(2)=255×D'(2)/W'(2) | D''(3)=255×D'(3)/W'(3) | ... | D''(n-1)=255×D'(n-1)/W'(n-1) | D''(n)=255×D'(n)/W'(n) |

FIG.5D

| PIXEL | 1 | 2 | 3 | ... | n-1 | n |
|---|---|---|---|---|---|---|
| SHADING-CORRECTED DETERMINATION DATA C'' | C''(1)=255×C'(1)/W'(1) | C''(2)=255×C'(2)/W'(2) | C''(3)=255×C'(3)/W'(3) | ... | C''(n-1)=255×C'(n-1)/W'(n-1) | C''(n)=255×C'(n)/W'(n) |

FIG.8 ns represented by a predetermined dew-condensation determination threshold value, to determine that dew condensation occurs on the transparent member.

An image forming apparatus of the present disclosure preferably comprises the above image scanner, and an image forming section for performing image forming using data scanned by the image scanning section.

IMAGE SCANNER, IMAGE FORMING APPARATUS AND DEW-CONDENSATION DETERMINATION METHOD

This application is based on Japanese Patent Application Serial No. 2011-144200 filed in Japan Patent Office on Jun. 29, 2011, the contents of which are hereby incorporated by reference.

BACKGROUND

The present disclosure relates to a technique for, in an image scanner and an image forming apparatus equipped with the image scanner, detecting that dew condensation occurs on a transparent member for placing a document thereon.

Heretofore, an image scanner has been configured to irradiate a document placed on a plate-shaped transparent member, with light from a light source, such as a fluorescent lamp or an LED, through the transparent member, and photoelectrically convert reflected light from the document by a photoelectric conversion element, thereby generating document image data as a scanned image of the document.

As one example of conventional art for determining that dew condensation occurs, there has been disclosed a technique of pre-storing, in a line memory, a data pattern obtained by scanning a reflector plate by one scanning line when no dew condensation occurs, and comparing data obtained by scanning the reflector plate by one scanning line at a timing of the determination, with the data pattern pre-stored in the line memory, wherein whether or not dew condensation occurs is determined based on whether or not they are coincident with each other.

However, in order to determine that dew condensation occurs, the conventional technique is required to ensure a storage area enough to pre-store therein data obtained by scanning an image of a dew-condensation determination member (reflector plate) by one line in a main scanning direction (by one scanning line) in the form of a plurality of pixels, in a situation where no dew condensation occurs.

In view of the above circumstance, it is an object of the present disclosure to provide an image scanner and an image forming apparatus capable of reducing an amount of data to be pre-stored for determining that dew condensation occurs on a transparent member for placing a document thereon.

SUMMARY

An image scanner of the present disclosure comprises: a plate-shaped transparent member for placing a document thereon; a light source for irradiating a document with light through the transparent member; an image scanning section for scanning an image of the document irradiated with light from the light source; a dew-condensation determination member provided on a portion of the transparent member; a dew-condensation determination data acquisition section operable to cause the image scanning section to scan an image of the dew-condensation determination member to thereby acquire the scanned image as dew-condensation determination data; a black reference data acquisition section operable to cause the image scanning section to scan an image without the light irradiation by the light source, to thereby acquire the scanned image as black reference data; and a dew-condensation determination section operable, when a difference between image brightness represented by the dew-condensation determination data and image brightness represented by the black reference data is greater than a difference in bright-

DETAILED DESCRIPTION

[First Embodiment]

With reference to the drawings, embodiments of an image scanner and an image forming apparatus of the present disclosure will now be described. The following embodiment will be described based on an example where the present disclosure is incorporated in a complex machine having functions of a copier, a facsimile machine, a printer, etc., as one embodiment of the image forming apparatus of the present disclosure.

Figure 1:
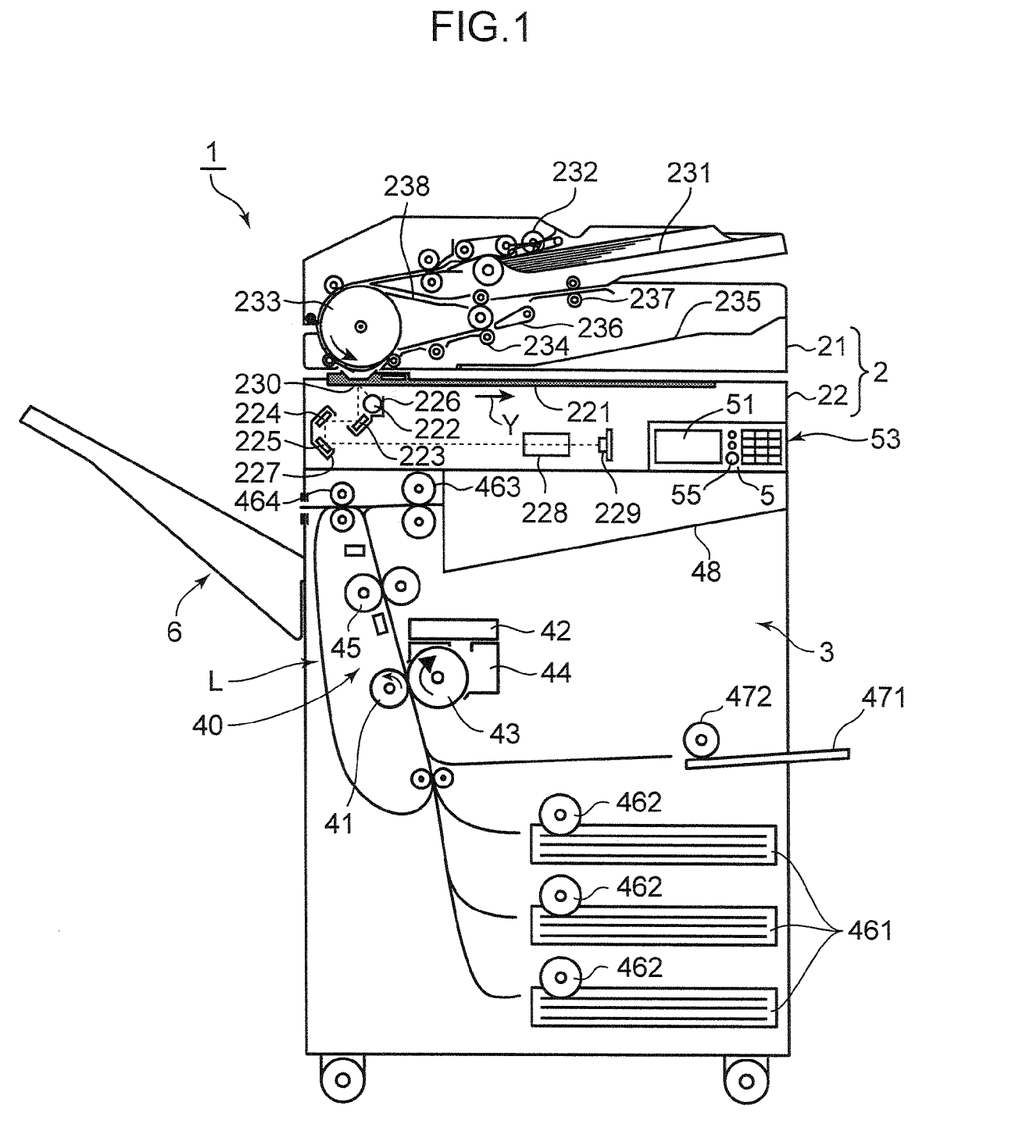
FIG. 1 is a vertical sectional view illustrating one example of a configuration of a complex machine as one example of an image forming apparatus of the present disclosure.

FIG. 1 is a vertical sectional view schematically illustrating an internal configuration of a complex machine 1 according to the first embodiment. The complex machine 1 illustrated in FIG. 1 comprises an image scanner 2 and a machine body 3.

The image scanner 2 comprises a document feed section 21 and a scanner section 22.

The document feed section 21 is designed to achieve an ADF (Automatic Document Feeder), wherein it comprises a document tray 231, a sheet feed roller 232, a conveyance drum 233, a sheet ejection roller 234, and a catch tray 235.

The document tray 231 is an area for placing one or more documents (document sheets) thereon. The documents placed on the document tray 231 are fed into a document conveyance path one-by-one by the sheet feed roller 232, and conveyed to the conveyance drum 233. The document passed through the conveyance drum 233 is ejected into the catch tray 235 through the sheet ejection roller 234.

The scanner section 22 serves as one example of an image scanning section in the present disclosure, and is designed to optically scan an image of the document to generate image data. The scanner section 22 comprises a contact glass 221, a light source 222, a first mirror 223, a second mirror 224, a third mirror 225, a first carriage 226, a second carriage 227, an imaging lens 228, a CCD (Charge Coupled Device) 229 which is a line sensor.

The contact glass 221 serves as one example of a transparent member in the present disclosure, and provides a surface for placing the document thereon. The light source 222 and the first mirror 223 are supported by the first carriage 226, and the second mirror 224 and the third mirror 225 are supported by the second carriage 227. For example, a white fluorescent lamp such as a white LED is used as the light source 222. When light is emitted from the light source 222 toward the document through the contact glass 221, light reflected from the document is led to the CCD 229 via the first mirror 223, the second mirror 224, the third mirror 225, the first carriage 226, the second carriage 227 and the imaging lens 228.

The CCD 229 is a so-called one-dimensional image sensor which is operable, upon receiving reflected light during scanning of a document by one line in a main scanning direction, to photoelectrically convert the received reflected light and output document image data of one line in the main scanning direction.

As a document scanning mode, the image scanner 2 has a flatbed scanning mode in which the document is scanned in a situation where it is placed on the contact glass 221, and an ADF scanning mode in which the document is scanned during conveyance thereof.

In the flatbed scanning mode, the light source 222 irradiates the document with light through the contact glass 221, and reflected light during scanning of one line of the main scanning direction equal to an arrangement direction of an array of pixels of the CCD 229 as a one-dimensional image sensor enters the imaging lens 228 after being reflected by the first mirror 223, the second mirror 224 and the third mirror 225 in this order. The light entering the imaging lens 228 provides an image on a light-receiving surface of the CCD 229.

Figure 3:
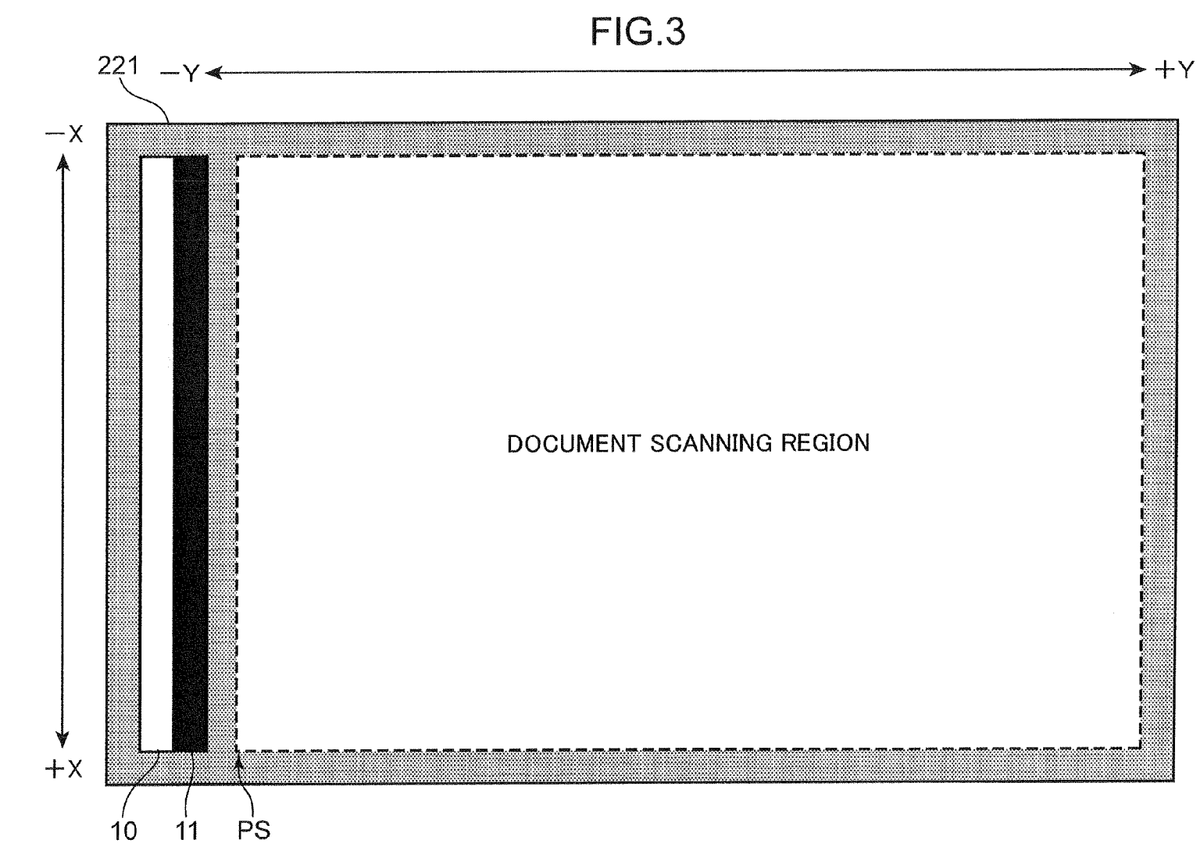
FIG. 3 is a plan view illustrating one example of a transparent member.

This operation will be performed in increments of one line along with a movement of the first carriage 226 and the second carriage 227 in a direction orthogonal to the main scanning direction (auxiliary scanning direction; the arrow Y direction in FIG. 3). The CCD 229 is operable to simultaneously subject the entire document image data of one line in the main scanning direction to image processing, and output the processed image data to an A/D conversion section 216 (see FIG. 4) in units of one line.

In the ADF scanning mode, the documents placed on the document tray 231 are fed into the document conveyance path one-by-one by the sheet feed roller 232. Then, when the document passes through and just above an image scanning position PS provided in a conveyance path extending from the conveyance drum 233 to the catch tray 235, the light source 222 irradiates the document with light. Thus, reflected light during scanning of one line in the main scanning direction enters the imaging lens 228 after being reflected by the first mirror 223, the second mirror 224 and the third mirror 225 in this order. The light entering the imaging lens 228 provides an image on the light-receiving surface of the CCD 229.

This operation will be performed in increments of one line along with feeding of the document by the conveyance drum 233. The CCD 229 is operable to simultaneously process the entire document image data of one line in the main scanning direction, and output the processed image data to the A/D conversion section 216 (see FIG. 4) in units of one line.

The document feed section 21 further comprises a document reversing mechanism composed of a change-over guide 236, a reversing roller 237 and a reversed-document conveyance path 238.

During a one-side scanning mode and after completion of scanning of a back face of the document during a both-side scanning mode, the change-over guide 236 is shifted to an upper position to allow the document passing through the conveyance drum 233 to be ejected into the catch tray 235 through the sheet ejection roller 234. Further, after completion of scanning of a front face of the document during the both-side scanning mode, the change-over guide 236 is shifted to a lower position to allow the document passing through the conveyance drum 233 to be conveyed to a nip zone of the reversing roller 237. Subsequently, the change-over guide 236 is shifted to the upper position, and the reversing roller 237 is rotated in the opposite direction to allow the document to be re-conveyed to the conveyance drum 233 via the reversed-document conveyance path 238.

In other words, the document whose front face has been scanned through the first scanning is reversed and re-conveyed using the document reversing mechanism composed of the change-over guide 236, the reversing roller 237 and the reversed-document conveyance path 238, so that it becomes possible to additionally scan the back face by the CCD 229.

The machine body 3 comprises: a plurality of sheet cassettes 461 each for housing a plurality of sheets (recording media); a recording section 40 for forming an image on a sheet conveyed from one of the sheet cassette 461; a plurality of sheet feed rollers 462 for feeding the sheets from respective ones of the sheet cassettes 461 one-by-one and conveying each of the sheets to the recording section 40; a stack tray 6 provided on a left side of the machine body 3; and conveyance rollers 463, 464 for conveying the sheet passing through the recording section 40 to the stack tray 6 or a catch tray 48.

The machine body 3 further comprises a manual feed tray 471. The manual feed tray 471 can be used for placing thereon any recording medium, such as a sheet having a size different from those of the sheets housed in the sheet cassettes, a sheet having one face formed with an image (backing sheet), or an OHP sheet. The recording media placed on manual feed tray 471 are fed into the machine body 3 one-by-one by a sheet feed roller 472.

The recording section 40 serves as one example of an image forming section in the present disclosure, and comprises: an exposure device 42 for outputting laser light in accordance with image data generated by the scanner section 22 to subject a photosensitive drum 43 to light exposure and thereby form an electrostatic latent image on a surface of the photosensitive drum 43; a developing device 44 for forming a toner image on the photosensitive drum 43 in accordance with the electrostatic latent image; a transfer device 41 for transferring the toner image formed on the photosensitive drum 43, onto a sheet; and a fixing device 45 for heating the sheet having the transferred toner image to fix toner image on the sheet.

The machine body 3 also has a manual operation section 5 provided on a front side thereof. The manual operation section 5 comprises a touch panel 51, a numeric keypad 53, and a start key 55. The touch panel 51 is adapted to display various operation screens, and various manual operation buttons for allowing a user to input various operational instructions therethrough. The numeric keypad 53 is used to input an execution condition such as the number of recording sheets to be subjected to image forming (copy number), and the start key 55 is used to input an instruction for starting to execute image forming processing by the recording section 40, etc.

Figure 2:
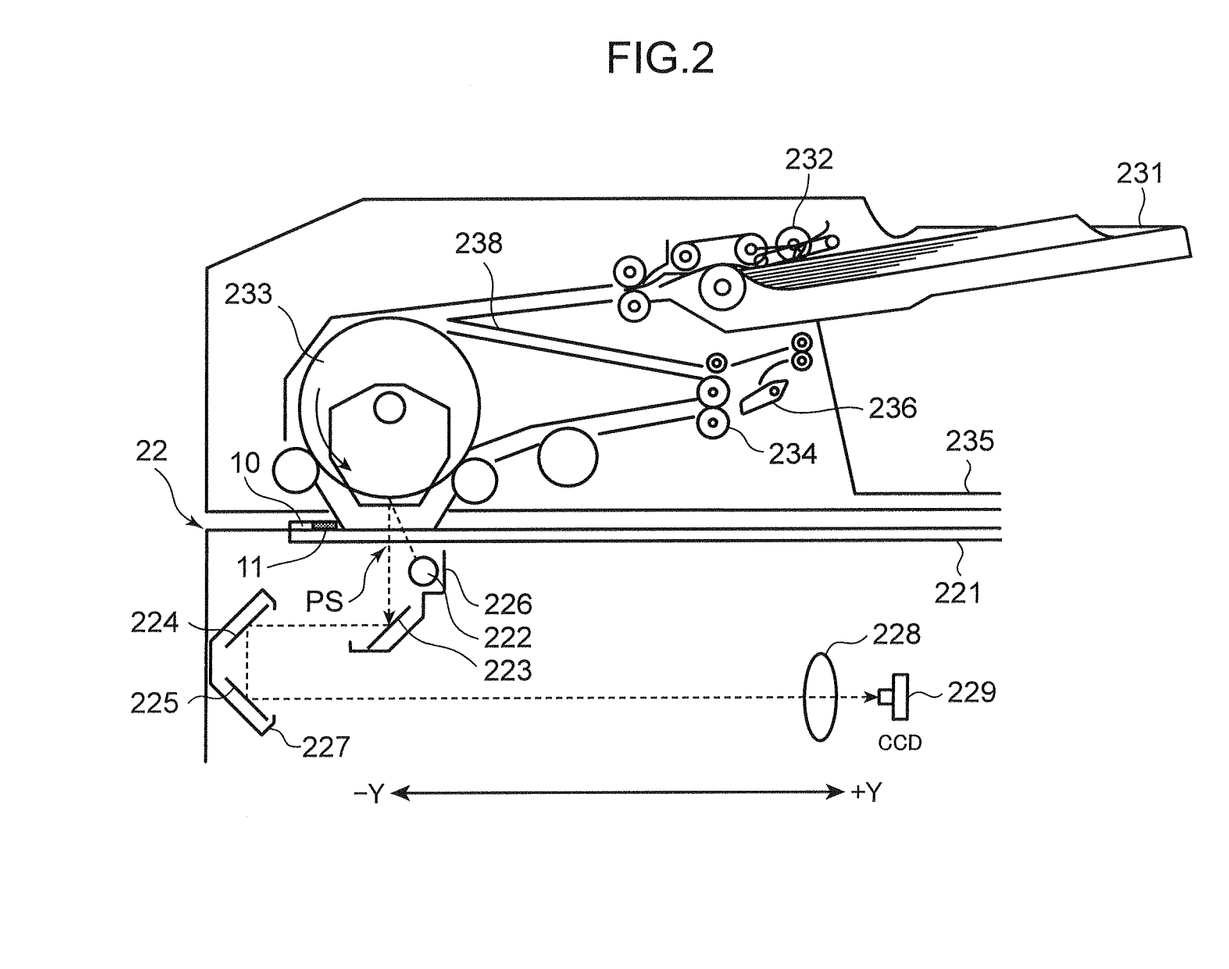
FIG. 2 is a schematic side view illustrating one example of a configuration of an image scanner of the complex machine.

FIG. 2 is an enlarged inside view of the document feed section 21 and the scanner section 22. FIG. 3 is a plan view of the contact glass 221 (when viewed upwardly from a lower side thereof).

As illustrated in FIGS. 2 and 3, a white reference plate serving as one example of a white reference member in the present disclosure, and a black reference plate 11 serving as one example of a dew-condensation determination member, are attached to the contact glass 221, at a position outside a region for placing a target document thereon (document scanning region) indicated by the dashed-line rectangle in FIG. 3, and offset in a direction (−Y direction in the figures) opposite to a direction along which scanning of the document is progressed, i.e., opposite to a direction of movement of the first carriage 226 and the second carriage 227 (+Y direction in the figures).

The white reference plate 10 is a white strip-shaped member attached to the contact glass 221 to extend in the main scanning direction (a direction orthogonal to a surface of the drawing sheet of FIG. 2; the X direction in FIG. 3), and the black reference plate 11 is a black strip-shaped member attached to the contact glass 221 to extend in the main scanning direction. The term "black" here means a color having a light reflectance of 30% or less.

Figure 4:
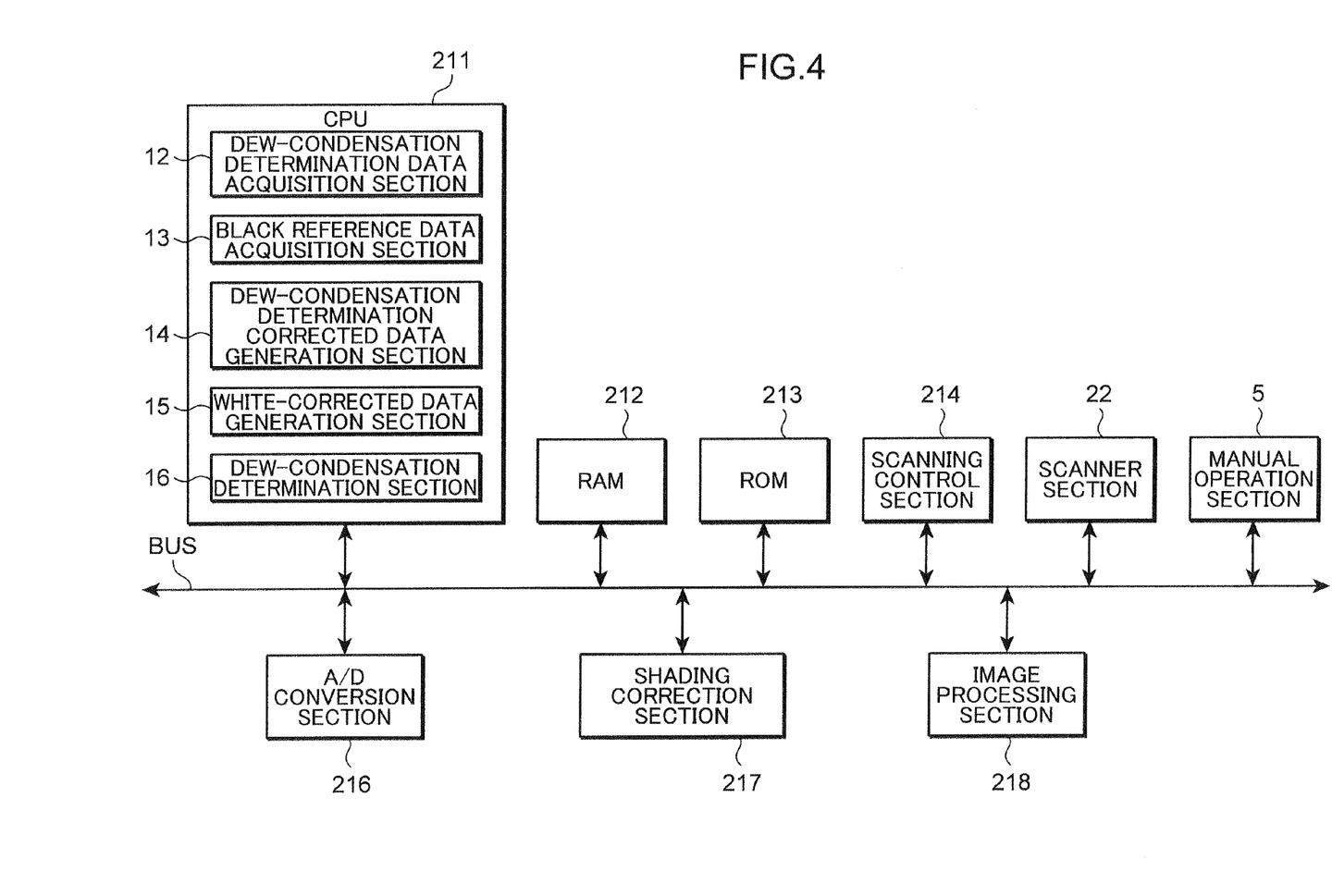
FIG. 4 is a block diagram illustrating a schematic configuration of the image scanner.

An electrical configuration of the complex machine 1 will be described below. FIG. 4 is a block diagram illustrating the electrical configuration of the complex machine 1. As illustrated in FIG. 4, the complex machine 1 comprises a CPU 211, a RAM 212, a ROM 213, a scanning control section 214, an A/D conversion section 216, a shading correction section 217, and an image processing section 218. These sections, the scanner section 22 and the manual operation section 5 are communicatably connected to each other via a bus BUS.

The CPU 211 is designed to govern general operational control of the complex machine 1, and operable to control operation of each section of the complex machine 1 according to a program stored in the ROM 213 or a non-illustrated HDD. In the first embodiment, the CPU 211 particularly functions as a dew-condensation determination data acquisition section 12, a black reference data acquisition section 13, a white-corrected data generation section 15, a dew-condensation determination corrected data generation section 14, and a dew-condensation determination section 16. Details of the dew-condensation determination data acquisition section 12, the black reference data acquisition section 13, the dew-condensation determination corrected data generation section 14, the white-corrected data generation section 15 and the dew-condensation determination section 16 will be described later.

The RAM 212 is a memory for use as a working area during the operational control of the complex machine 1 and the image scanner 2 by the CPU 211 according to the program. The ROM 213 is a memory for storing therein the program, various set values and others.

The scanning control section 214 is operable to perform control of causing the scanner section 22 to scan an image of a document in increments of one line in the main scanning direction while being relatively moved in the auxiliary scanning direction with respect to the document.

Specifically, the scanning control section 214 is operable to allow the scanner section 22 to scan the image of the document by controlling an operation of irradiating a document with light from the light source 222, an operation of moving the first carriage 226 and the second carriage 227 in the auxiliary scanning direction, an operation of conveying a document in the auxiliary scanning direction by the document feed section 21, and an operation of receiving light by the CCD 229.

The A/D conversion section 216 is operable to perform an A/D conversion processing of converting document image data of one line in the main scanning direction, i.e., an analog electrical signal output from the CCD 229 of the scanner section 22, into digital image data having a predetermined bit number. The A/D conversion section 216 is operable to output the A/D converted image data to the shading correction section 217, the dew-condensation determination data acquisition section 12, the black reference data acquisition section 13, the dew-condensation determination corrected data generation section 14, the white-corrected data generation section 15, the dew-condensation determination section 16, etc.

The shading correction section 217 is operable to subject the document image data output through the scanner section 22 and the A/D conversion section 216 to shading correction, using aftermentioned black reference data output from the black reference data acquisition section 13, and aftermentioned white-corrected data output from the white-corrected data generation section 15. Details of the shading correction by the shading correction section 217 will be described later.

The image processing section 218 is designed to subject the image data output from the A/D conversion section 216 or the shading-corrected image data output from the shading correction section 217 to various image processing. For example, the image processing section 218 is operable to perform image modification processing, such as correction processing including level correction and gamma correction, image data compression or decompression processing, or image enlargement and reduction processing.

Now, various processing to be performed in the dew-condensation determination data acquisition section 12, the black reference data acquisition section 13, the dew-condensation determination corrected data generation section 14, the white-corrected data generation section 15, the dew-condensation determination section 16 and the shading correction section 217 will be described in detail below.

Figure 5A:
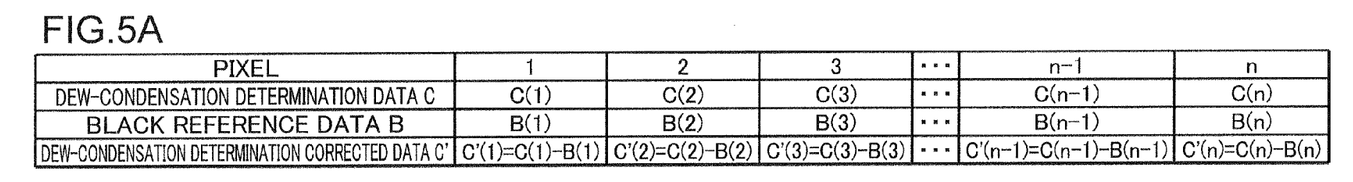
FIGS. 5A to 5D are explanatory diagrams illustrating one examples of data handled by a dew-condensation determination data acquisition section, a black reference data acquisition section, a dew-condensation determination corrected data generation section, a white-corrected data generation section, or a shading correction section.

As illustrated in FIG. 5A, the dew-condensation determination data acquisition section 12 is operable to cause the scanner section 22 to scan an image of the black reference plate 11 by one line in the main scanning direction, in the form of a plurality of pixels 1, 2, 3, - - - , n−1, n, to thereby acquire respective pixel values $C(1)$, $C(2)$, $C(3)$, - - - , $C(n-1)$, $C(n)$ of the pixels.

Each of the pixel values $C(1)$ to $C(n)$ indicates brightness of a corresponding one of the pixels 1 to n by 8 bits (0 to 255), i.e., 256 scales. For example, a pixel value of 0 indicates the lowest brightness, and a pixel value of 255 indicates the highest brightness. The pixel values $C(1)$ to $C(n)$ make up dew-condensation determination data C of one line in the main scanning direction. In the following description, a figure suffix to a pixel value in parentheses indicates a number of a corresponding pixel.

As illustrated in FIG. 5A, the black reference data acquisition section 13 is operable to cause the A/D conversion section 216 to subject an analog electrical signal output from the CCD 229 of the scanner section 22 to A/D conversion processing, without the light irradiation by the light source 222, i.e., to cause the scanner section 22 to scan an image by one line in the main scanning direction in the form of the plurality of pixels 1, 2, 3, - - - , n−1, n, without the light irradiation by the light source 222, to thereby obtain respective pixel values $B(1)$, $B(2)$, $B(3)$, - - - , $B(n-1)$, $B(n)$ of the pixels, and store the acquired pixel values $B(1)$ to $B(n)$ in the RAM 212. The pixel values $B(1)$ to $B(n)$ make up black reference data B of one line in the main scanning direction. The black reference data acquisition section may be configured to, when the black reference data B has already been stored in the RAM 212, avoid newly acquiring black reference data B.

As illustrated in FIG. 5A, the dew-condensation determination corrected data generation section 14 is operable to calculate dew-condensation determination corrected values C'(1), C'(2), C'(3), - - -, C'(n−1), C'(n) each of which is a difference in the pixel value between each pair of corresponding pixels in the dew-condensation determination data C and the black reference data B. The dew-condensation determination corrected values C'(1) to C'(n) make up dew-condensation determination corrected data C' of one line in the main scanning direction.

Figure 5B:
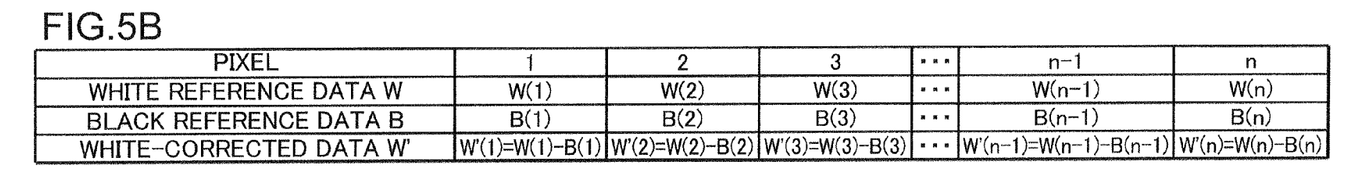

As illustrated in FIG. 5B, the white-corrected data generation section 15 is operable to cause the scanner section 22 to scan an image of the white reference plate 10 by one line in the main scanning direction, in the form of a plurality of pixels 1, 2, 3, - - -, n−1, n, to thereby acquire respective pixel values W(1), W(2), W(3), - - -, W(n−1), W(n) of the pixels. The pixel values W(1) to W(n) make up white reference data W of one line in the main scanning direction.

Then, the white-corrected data generation section 15 is operable to calculate white-corrected values W'(1) to W'(n) each of which is a difference in the pixel value between each pair of corresponding pixels in the generated white reference data W and the black reference data B (for example, in the pixel n, W'(n)=W(n)−B(n)). The white-corrected values W'(1) to W'(n) make up white-corrected data W' of one line in the main scanning direction.

Figure 5C:
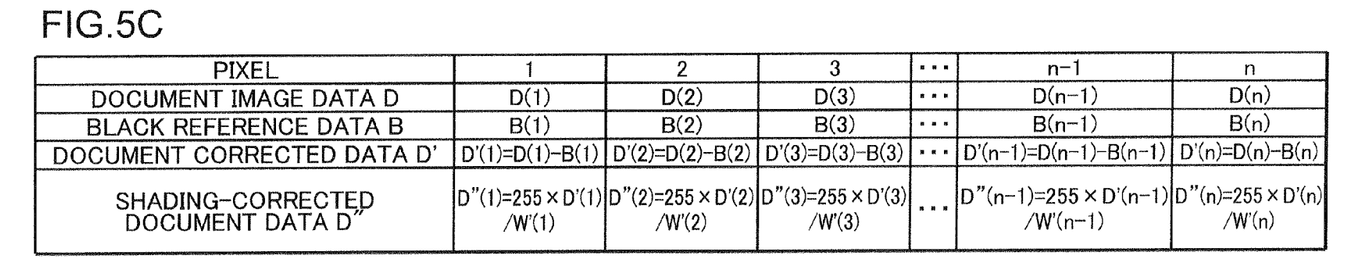

As illustrated in FIG. 5C, the shading correction section 217 is operable to cause the scanner section 22 to scan an image of a document by one line in the main scanning direction, in the form of a plurality of pixels 1, 2, 3, - - -, n−1, n, to thereby acquire respective pixel values D(1), D(2), D(3), - - -, D(n−1), D(n) of the pixels. The pixel values D(1) to D(n) make up document image data D of one line in the main scanning direction.

Then, the shading correction section 217 is operable to calculate document corrected values D'(1), D'(2), D'(3), - - -, D'(n−1), D'(n) each of which is a difference in the pixel value between each pair of corresponding pixels in the document image data D and the black reference data B (for example, in the pixel n, D'(n)=D(n)−B(n)). The document corrected values D'(1) to D'(n) make up document corrected data D' of one line in the main scanning direction.

Further, the shading correction section 217 is operable to multiply a ratio between the pixel values of each pair of corresponding pixels in the document corrected data (D') and the white-corrected data (W'), by an upper limit of the pixel value (for example, when the pixel value is represented by 8 bits, the upper limit is 255), to derive shading-corrected document pixel values D"(1), D"(2), D"(3), - - -, D"(n−1), D"(n) (for example, in the pixel n, D"(n)=255×D'(n)/W'(n)). The shading-corrected document pixel values D"(1) to D"(n) make up shading-corrected document data D" of one line in the main scanning direction.

As above, the shading correction section 217 is operable, based on document image data D obtained by scanning an image of a document by one line in the main scanning direction, to subject the document image data D to shading correction to generate shading-corrected document data D". In this manner, the document image data D to be used for image forming is subjected to the shading correction, so that it becomes possible to correct unevenness in distribution of irradiation light from the light source 222 of the scanner section 22 and a difference in sensitivity between the pixels of the CCD 229.

The dew-condensation determination section 16 is operable to determine whether or not dew condensation occurs on the contact glass 221. Specifically, as illustrated in FIG. 5A, the dew-condensation determination section 16 is configured to, when any one of the dew-condensation determination corrected values C'(1) to C'(n) in the dew-condensation determination corrected data C' of one line in the main scanning direction, generated by the dew-condensation determination corrected data generation section 14, is greater than a predetermined dew-condensation determination threshold value, determine that dew condensation occurs on the contact glass 221. In this case, the predetermined dew-condensation determination threshold value is pre-set based on an experimental value obtained, for example, by performing a test operation in a situation where dew condensation occurs on the contact glass 221, and pre-stored in the ROM 213.

The above embodiment has been described based on an example where the dew-condensation determination data C is composed of pixel values of the plurality of pixels 1 to n in the image of the black reference plate 11 of one line in the main scanning direction, scanned by the scanner section 22, and the black reference data B is composed of pixel values of the plurality of pixels 1 to n of the image of the black reference plate 11 of one line in the main scanning direction, scanned without the light irradiation by the light source 222, wherein the dew-condensation determination corrected data C' consisting of the dew-condensation determination corrected values corresponding to the plurality of pixel 1 to n is generated using the dew-condensation determination corrected data C' and the black reference data B, and the occurrence of dew condensation is determined using the dew-condensation determination corrected data C'.

However, this description is not meant to be construed in a limiting sense, but the complex machine may be configured such that the dew-condensation determination data C is composed of a pixel value of one of or pixel values of a part of the plurality of pixels 1 to n in the image of the black reference plate 11 of one line in the main scanning direction, scanned by the scanner section 22, and the black reference data B is composed of a pixel value of one of or pixel values of a part of the plurality of pixels 1 to n in the image of the black reference plate 11 of one line in the main scanning direction, scanned without the light irradiation by the light source 222, wherein dew-condensation determination corrected data C' corresponding to the one or part of the plurality of pixels 1 to n is generated using the dew-condensation determination corrected data C' and the black reference data B, and the occurrence of dew condensation is determined using the generated dew-condensation determination corrected data C'.

Alternatively, the dew-condensation determination section 16 may be configured to, when, in the dew-condensation determination corrected data C' of one line in the main scanning direction, generated by the dew-condensation determination corrected data generation section 14, a predetermined reference number or more of the dew-condensation determination corrected values C'(1) to C'(n) are greater than the predetermined dew-condensation determination threshold value, determine that dew condensation occurs on the contact glass 221. In this case, it becomes possible to reduce a risk that the determination is erroneously made, as compared to the case where it is determined that dew condensation occurs on the contact glass 221, even when only one of the dew-condensation determination corrected values C'(1) to C'(n) is greater than the predetermined dew-condensation determination threshold value.

More specifically, one example of an image scanner in this disclosure comprises the image scanner 2, the dew-condensation determination data acquisition section 12, the black reference data acquisition section 13, the dew-condensation determination corrected data generation section 14, and the dew-condensation determination section 16.

When light is emitted from the light source 222 to the contact glass 221 on which dew condensation occurs, the light is irregularly reflected by a portion of the contact glass 221 where dew condensation occurs, causing an increase in reflectance. Thus, an image scanned in this situation becomes brighter as compared to a situation where no dew condensation occurs. On the other hand, an image scanned without the light irradiation has no change in brightness, irrespective of whether or not dew condensation occurs. Therefore, a difference in brightness between an image scanned without the light irradiation and an image scanned with the light irradiation becomes larger when dew condensation occurs on the contact glass 221. In other words, based on a level of the difference in brightness between the image scanned without the light irradiation and the image scanned with the light irradiation, it can be determined whether or not dew condensation occurs on the contact glass 221.

In the first embodiment, the dew-condensation determination section 16 is configured to, when a difference between image brightness represented by the dew-condensation determination data C and image brightness represented by the black reference data B (a difference in image brightness represented by the dew-condensation determination corrected data C') is greater than a difference in brightness represented by a predetermined dew-condensation determination threshold value, determine that dew condensation occurs on the contact glass 221. This means that data to be pre-stored for the dew-condensation determination can be limited to only the dew-condensation determination threshold value. Thus, it becomes possible to reduce an amount of data to be pre-stored for the dew-condensation determination.

Figure 6:
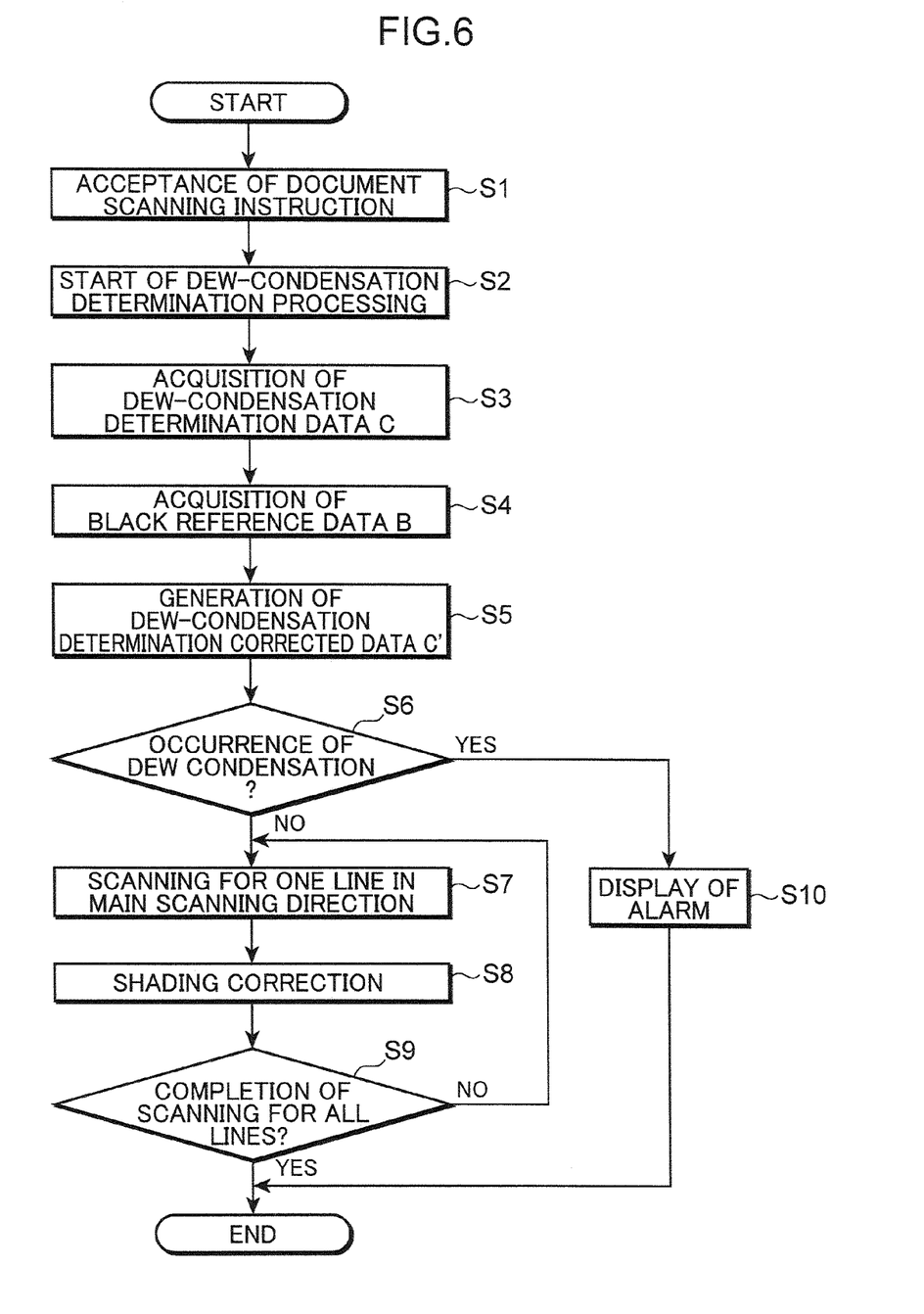
FIG. 6 is a flowchart illustrating one example of document scanning control by a scanning control section.

With reference to FIG. 6, the document scanning control by the scanning control section 214 will be described in detail below.

When a document scanning instruction for the scanning control section 214 is input, for example, through the manual operation section 5 manually operated by a user, and accepted by the CPU 211 (S1), the scanning control section 214 instructs the dew-condensation determination section 16 to start dew-condensation determination processing, so that the dew-condensation determination section 16 starts the dew-condensation determination processing according to the instruction (S2).

The dew-condensation determination section 16 operates to cause the dew-condensation determination data acquisition section 12 to acquire the dew-condensation determination data C (S3), and cause the black reference data acquisition section 13 to acquire the black reference data B (S4). Then, the dew-condensation determination section 16 operates to cause the dew-condensation determination corrected data generation section 14 to generate the dew-condensation determination corrected data C' (S5).

Then, the dew-condensation determination section 16 operates to, based on a comparison between the dew-condensation determination corrected data C' generated in Step S5 and the predetermined dew-condensation determination threshold value, determine whether or not dew condensation occurs on the contact glass 221 (S6).

When the dew-condensation determination section 16 determines that no dew condensation occurs on the contact glass 221 (NO in Step S6), the scanning control section 214 operates to move the first and second carriages 226, 227 of the scanner section 22 to the document scanning start position PS. Then, the scanning control section 214 operates to cause the scanner section 22 to scan an image of a document by one line in the main scanning direction (S7), and cause the shading correction section 217 to shading-correct the scanned document image data D of one line in the main scanning direction (S8).

Then, the scanning control section 214 operates to determine whether document scanning for all lines in the main scanning direction has been completed (S9). When it is determined that the document scanning for all lines in the main scanning direction has not been completed (NO in Step S9), the scanning control section 214 operates to cause the scanner section 22 to scan the document by the next one line in the main scanning direction (S7), and cause the shading correction section 217 to shading-correct the scanned document image data D of one line in the main scanning direction (S8). On the other hand, when it is determined that the document scanning for all lines in the main scanning direction has been completed (YES in Step S9), the scanning control section 214 operates to terminate the document scanning control.

Document image data D of all lines in the main scanning direction, shading-corrected in Steps S1 to S9 in the above manner, will be used for the image forming.

On the other hand, when the dew-condensation determination section 16 determines that dew condensation occurs on the contact glass 221 (YES in Step S6), the scanning control section 214 operates to display an alarm message indicating that dew condensation occurs on the contact glass 221, for example, on the touch panel 51 of the manual operation section 5, without causing the scanner section 22 to scan the document (S10).

This means that the dew-condensation determination is performed before an image of a document is scanned by the scanner section 22. Thus, it becomes possible to avoid a situation where the scanner section 22 scans an image of a document in an undesirable manner when dew condensation occurs on the contact glass 221.

[Second Embodiment]

In the following description of a second embodiment, only a difference from the first embodiment will be described in detail, and description of the same part as the first embodiment will be omitted.

Figure 5D:
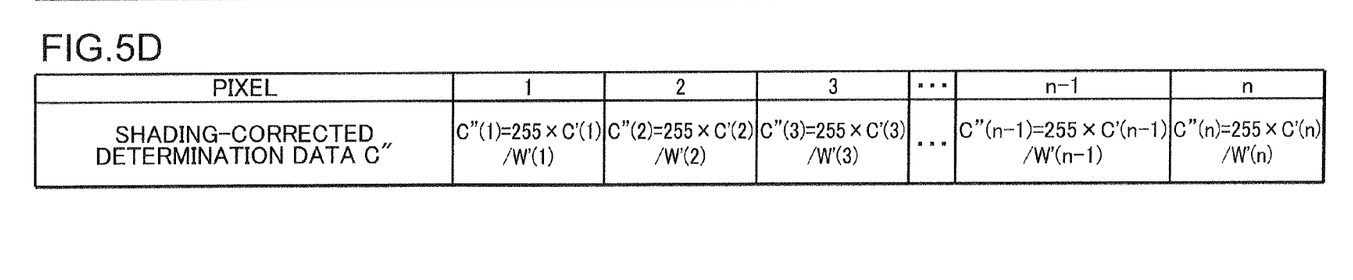
Figure 7:
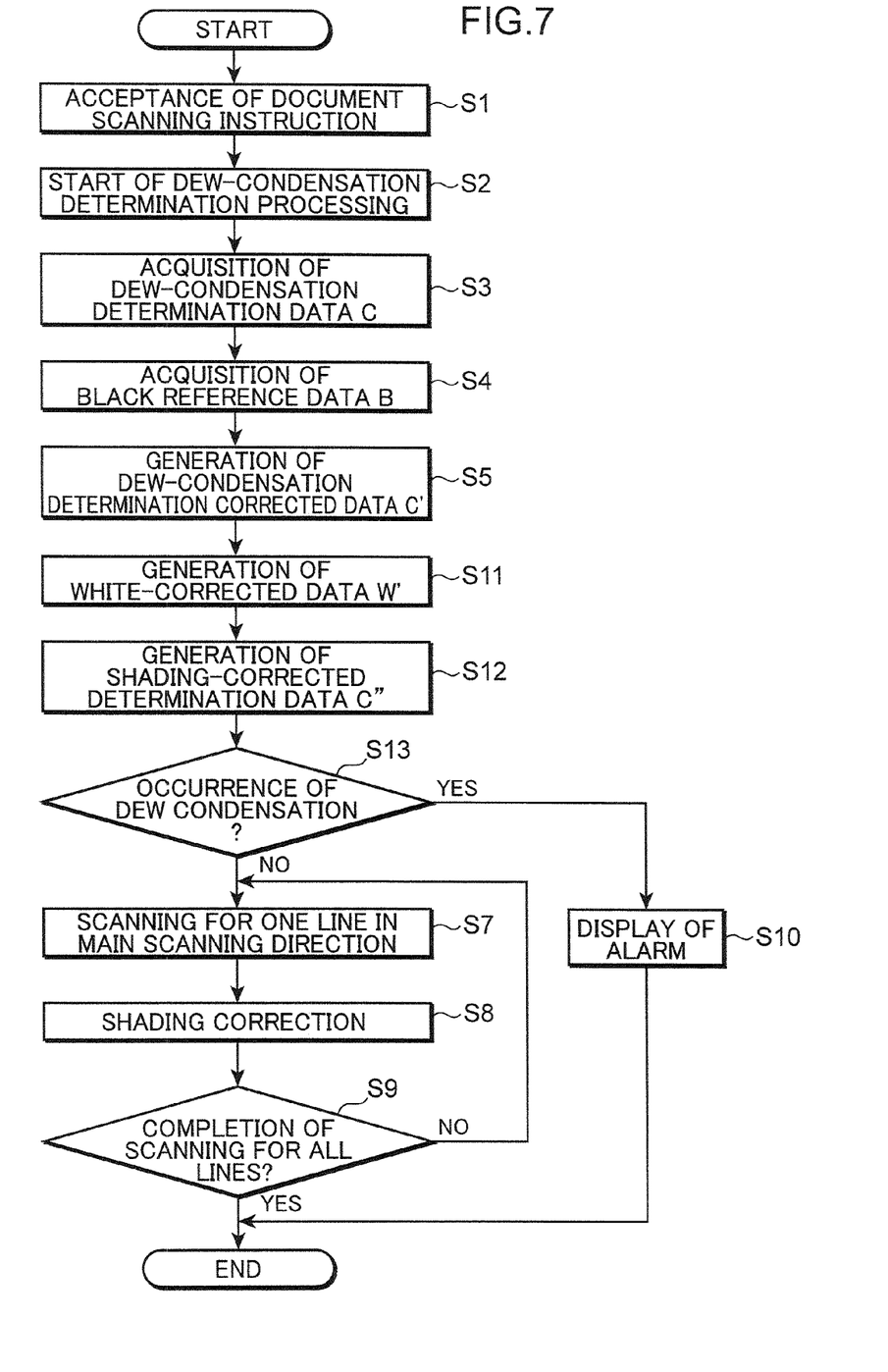
FIG. 7 is a flowchart illustrating another example of the document scanning control by the scanning control section, different from that in FIG. 6.

As illustrated in FIG. 7, in the second embodiment, the dew-condensation determination section 16 operates to cause the dew-condensation determination corrected data generation section to generate the dew-condensation determination corrected data C' in Step S5, and then cause the white-corrected data generation section 15 to generate the white-corrected data W' (S11). Then, the dew-condensation determination section 16 operates to cause the shading correction section 217 to perform shading correction using the dew-condensation determination corrected data C' generated in Step S5 and the white-corrected data W' generated in Step S11 to thereby generate shading-corrected determination data C'' as illustrated in FIG. 5D (S12). In other words, the shading-corrected determination data C'' is data obtained by subjecting the dew-condensation determination data C to shading correction.

Then, when a value indicated by any one of the pixels in the shading-corrected determination data C'' is greater than the dew-condensation determination threshold value, the dew-condensation determination section 16 determines that dew condensation occurs on the contact glass 221.

In the second embodiment, the image scanner may be configured such that the shading-corrected determination data C'' is composed of a pixel value of one of or pixel values of a part of the plurality of pixels 1 to n in the image of the black reference plate 11 of one line in the main scanning direction, scanned by the scanner section 22, wherein the occurrence of dew condensation is determined using the generated shading-corrected determination data C", in a similar manner to that in the first embodiment. Further, the dew-condensation determination section may be configured to, when, in the shading-corrected determination data C", a predetermined reference number or more of values indicated by the pixels are greater than the dew-condensation determination threshold value, determine that dew condensation occurs on the contact glass 221.

Figure 8:
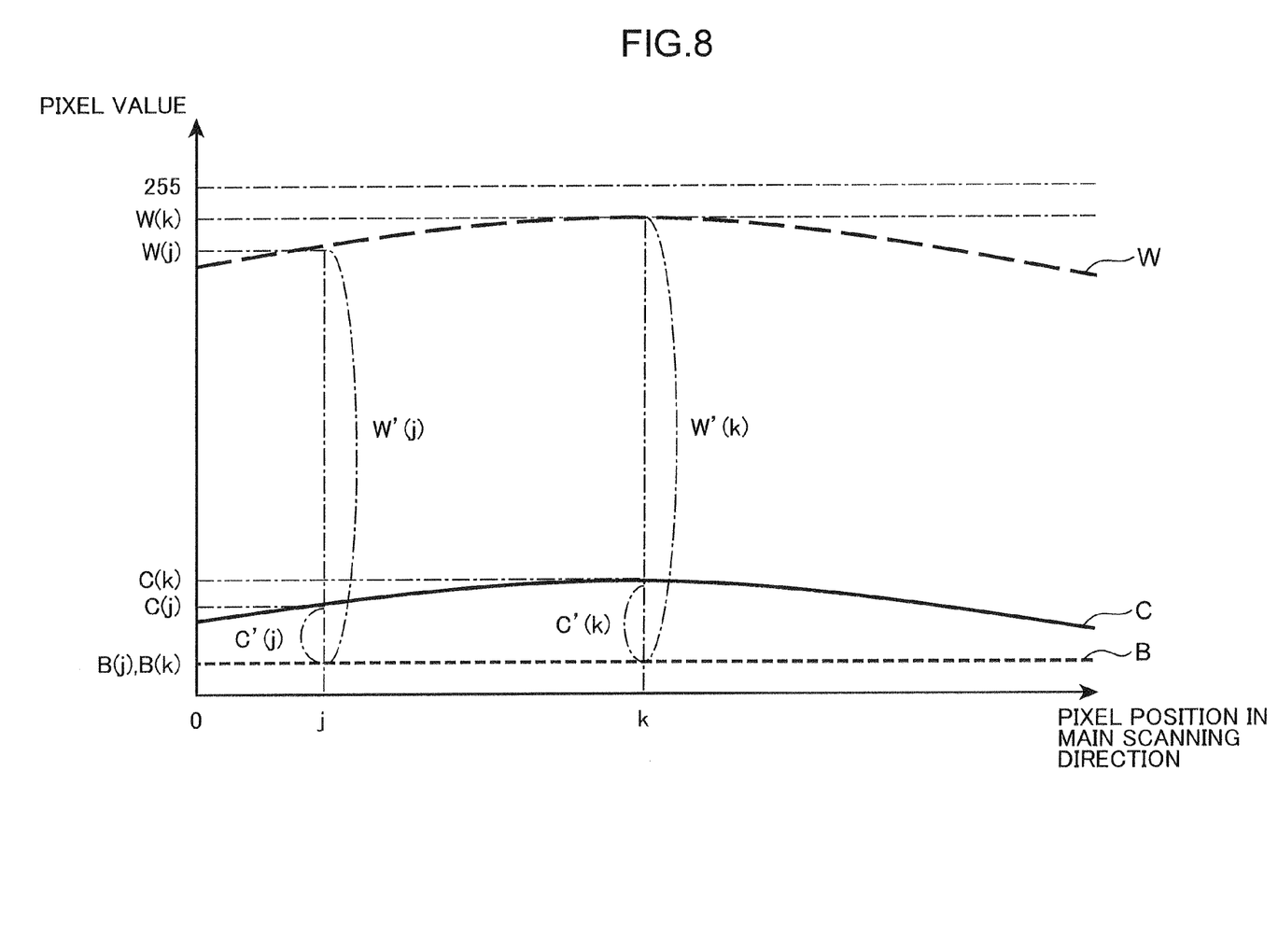
FIG. 8 is an explanatory diagram illustrating one example of shading correction to be applied to dew-condensation determination data.

For example, as illustrated in FIG. 8, when the black reference plate 11 is scanned by the scanner section 22, a difference is likely to occur between pixel values C(j), C(k) of two pixels j, k in the dew-condensation determination data C, due to unevenness in distribution of irradiation light from the light source 222 and a difference in sensitivity between the pixels of the CCD 229.

However, based on shading-correcting the dew-condensation determination data C by the shading correction section 217, a ratio (C'(j)/W'(j), C'(k)/W'(k)) between pixel values of each of two pairs of corresponding pixels j, k in the dew-condensation determination corrected data C' generated using the dew-condensation determination data C and the black reference data B, and the white-corrected data W' generated using the white reference data W and the black reference data B, are multiplied by an upper limit (e.g., 255) of the pixel value, to derive a value (C"(j), C"(k)) indicated by each of the pixels j, k in the shading-corrected determination data C".

Thus, the value (C"(j), C" (k)) indicated by each of the pixels j, k in the shading-corrected determination data C" is calculated using the ratio between pixel values of a respective one of the two pairs of corresponding pixels j, k in the dew-condensation determination corrected data C' and the white-corrected data W', so that unevenness in distribution of irradiation light from the light source 222 and a difference in sensitivity of the CCD 229 between the pixels j, k is cleared up to allow the pixels j, k to have approximately the same pixel value.

Thus, in the second embodiment, the occurrence of dew condensation on the contact glass 221 is determined using the dew-condensation determination data C subjected to shading correction (shading-corrected determination data C") which becomes free from a difference in pixel value between pixels, so that it becomes possible to eliminate a need for setting the dew-condensation determination threshold value to a relatively large value in consideration of a variation between pixels, and accurately determine whether or not dew condensation occurs on the contact glass 221.

Although the above embodiments have been described by taking a black and white complex machine as one example of the image forming apparatus of the present disclosure, this description is not meant to be construed in a limiting sense, but the image forming apparatus of the present disclosure may be a color complex machine, or a printer, copier, scanner apparatus or facsimile machine equipped with the image scanner of the present disclosure.

The present disclosure is not limited to the above embodiments, but various changes and modifications may be made therein. Although the configurations and processes illustrated in FIGS. 1 to 8 are shown by way of specific embodiments of the disclosure only, they are not meant to limit the present disclosure to the specific embodiments.

For example, in the first embodiment, the complex machine 1 may be simplified by omitting the shading correction section 217. Further, in this connection, the processing in Step S5 in FIG. 6 may be eliminated to simplify the configuration.

Further, the black reference plate 11 may have a color different from black. However, when the black reference plate 11 is black in color, an influence of dew condensation on irregular reflection becomes larger, i.e., a difference between corresponding pixel values in dew-condensation determination data obtained when dew condensation occurs and dew-condensation determination data obtained when no dew condensation occurs becomes larger. Therefore, the black reference plate 11 makes it possible to facilitate finely adjusting the dew-condensation determination threshold value, and improve accuracy of the determination on the occurrence of dew condensation, as compared to the case where the black reference plate 11 is not black in color.

EXPLANATION OF CODES

1: complex machine (image forming apparatus)
10: white reference plate (white reference member)
11: black reference plate (dew-condensation determination member)
12: dew-condensation determination data acquisition section
13: black reference data acquisition section
14: dew-condensation determination corrected data generation section
15: white-corrected data generation section
16: dew-condensation determination section
2: image scanner
214: scanning control section
217: shading correction section
22: scanner section (image scanning section)
221: contact glass (transparent member)
222: light source
40: recording section (image forming section)
B: black reference data
C: dew-condensation determination data
C': dew-condensation determination corrected data
C'(1) to C'(n): dew-condensation determination corrected values
PS: image scanning position (document scanning start position)
W: white reference data
W': white-corrected data
W'(1) to W'(n): white-corrected values Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image scanner comprising:
a plate-shaped transparent member for placing a document thereon;
a light source for irradiating a document with light through the transparent member;
an image scanning section for scanning an image of the document irradiated with light from the light source;
a dew-condensation determination member provided on the transparent member;
a dew-condensation determination data acquisition section operable to cause the image scanning section to scan an image of the dew-condensation determination member to thereby acquire the scanned image as dew-condensation determination data;
a black reference data acquisition section operable to cause the image scanning section to scan an image without the light irradiation by the light source, to thereby acquire the scanned image as black reference data; and a dew-condensation determination section operable, when a difference between image brightness represented by the dew-condensation determination data and image brightness represented by the black reference data is greater than a difference in brightness represented by a predetermined dew-condensation determination threshold value, to determine that dew condensation occurs on the transparent member.

2. The image scanner as defined in claim 1, wherein:

the dew-condensation determination data acquisition section is operable to cause the image scanning section to scan an image of the dew-condensation determination member in the form of a plurality of pixels to thereby acquire the scanned image as the dew-condensation determination data; and the black reference data acquisition section is operable to cause the image scanning section to scan an image in the form of the plurality of pixels without the light irradiation by the light source, to thereby acquire the scanned image as the black reference data, wherein the image scanner further comprises a dew-condensation determination corrected data generation section operable to calculate, as a dew-condensation determination corrected value, a difference in pixel value which represents the image brightness by a value ranging from 0 to a predetermined upper limit, between each pair of corresponding pixels in the dew-condensation determination data and the black reference data, to generate dew-condensation determination corrected data consisting of a plurality of the dew-condensation determination corrected values corresponding to the plurality of pixels, and wherein the dew-condensation determination section is operable, based on a comparison between each of the plurality of dew-condensation determination corrected values corresponding to the plurality of pixels, and the dew-condensation determination threshold value, to determine whether or not dew condensation occurs on the transparent member.

3. The image scanner as defined in claim 2, wherein the dew-condensation determination section is operable, when, among the plurality of dew-condensation determination corrected values corresponding to the plurality of pixels, the number of dew-condensation determination corrected values each greater than the dew-condensation determination threshold value is equal to or greater than a predetermined reference value, to determine that dew condensation occurs on the transparent member.

4. The image scanner as defined in claim 2, which further comprises:

a white reference member provided on the transparent member to serve as a white reference;

a white-corrected data generation section operable to cause the image scanning section to scan an image of the white reference member in the form of the plurality of pixels to thereby generate white reference data, and calculate, as a white-corrected value, a difference in the pixel value between each pair of corresponding pixels in the white reference data and the black reference data (B), to generate white-corrected data consisting of a plurality of the white-corrected values corresponding to the plurality of pixels; and a shading correction section operable to multiply a ratio of the dew-condensation determination corrected value to the white-corrected value for each pair of corresponding pixels in the dew-condensation determination corrected data and the white-corrected data, by the upper limit of the pixel value, to shading-correct the dew-condensation determination data, wherein the dew-condensation determination section is operable, based on a comparison between each of values indicated by the pixels in the shading-corrected dew-condensation determination data, and the dew-condensation determination threshold value, to determine whether or not dew condensation occurs on the transparent member.

5. The image scanner as defined in claim 1, further comprising a scanning control section operable to cause the image scanning section to scan an image of a document in increments of one line in a main scanning direction, while relatively moving the image scanning section in an auxiliary scanning direction with respect to the document, wherein:

the dew-condensation determination member is disposed on the transparent member at a position offset in a direction opposite to a direction along which the image scanning section is moved according to the scanning control section, with respect to a position where the scanning of the document image by the image scanning section is started; and the scanning control section is operable, before causing the image scanning section to scan the document image, to cause the dew-condensation determination section to perform the determination.

6. The image scanner as defined in claim 2, further comprising a scanning control section operable to cause the image scanning section to scan an image of a document in increments of one line in a main scanning direction (X-X), while relatively moving the image scanning section in an auxiliary scanning direction (Y-Y) with respect to the document, wherein:

the dew-condensation determination member is disposed on the transparent member at a position offset in a direction opposite to a direction toward which the image scanning section is moved according to the scanning control section, with respect to a position where the scanning of the document image by the image scanning section is started; and the scanning control section is operable, before causing the image scanning section to scan the document image, to cause the dew-condensation determination section to perform the determination.

7. The image scanner as defined in claim 3, further comprising a scanning control section operable to cause the image scanning section to scan an image of a document in increments of one line in a main scanning direction (X-X), while relatively moving the image scanning section in an auxiliary scanning direction (Y-Y) with respect to the document, wherein:

the dew-condensation determination member is disposed on the transparent member at a position offset in a direction opposite to a direction toward which the image scanning section is moved according to the scanning control section, with respect to a position where the scanning of the document image by the image scanning section is started; and the scanning control section is operable, before causing the image scanning section to scan the document image, to cause the dew-condensation determination section to perform the determination.

8. The image scanner as defined in claim 4, further comprising a scanning control section operable to cause the image scanning section to scan an image of a document in increments of one line in a main scanning direction, while relatively moving the image scanning section in an auxiliary scanning direction with respect to the document, wherein:

each of the white reference member and the dew-condensation determination member is disposed on the transparent member at a position offset in a direction opposite to a direction toward which the image scanning section is moved according to the scanning control section, with respect to a position where the scanning of the document image by the image scanning section is started; and the scanning control section is operable, before causing the image scanning section to scan the document image, to cause the dew-condensation determination section to perform the determination.

9. The image scanner as defined in claim 1, wherein the dew-condensation determination member is black in color.

10. An image forming apparatus comprising the image scanner as defined in claim 1, and an image forming section for performing image forming using data scanned by the image scanning section.

11. A method of determining an occurrence of dew condensation on a transparent member of an image scanner, the image scanner including: a plate-shaped transparent member for placing a document thereon; a light source for irradiating a document with light through the transparent member; an image scanning section for scanning an image of the document irradiated with light from the light source; a dew-condensation determination member provided on the transparent member; a dew-condensation determination data acquisition section operable to cause the image scanning section to scan an image of the dew-condensation determination member to thereby acquire the scanned image as dew-condensation determination data; a black reference data acquisition section operable to acquire black reference data about an image scanned by the image scanning section; and a dew-condensation determination section operable to determine whether or not dew condensation occurs on the transparent member, the method comprising:

rendering the black reference data acquisition section to operate to cause the image scanning section to scan an image without the light irradiation by the light source, to thereby acquire the scanned image as the black reference data; and rendering the dew-condensation determination section to, when a difference between image brightness represented by the dew-condensation determination data and image brightness represented by the black reference data is greater than a difference in brightness represented by a predetermined dew-condensation determination threshold value, determine that dew condensation occurs on the transparent member.

12. The method as defined in claim 11, which comprises:
the dew-condensation determination data acquisition section to operate to cause the image scanning section to scan an image of the dew-condensation determination member in the form of a plurality of pixels to thereby acquire the scanned image as the dew-condensation determination data; and the black reference data acquisition section to operate to cause the image scanning section to scan an image in the form of the plurality of pixels without the light irradiation by the light source, to thereby acquire the scanned image as the black reference data, wherein the image scanner further includes a dew-condensation determination corrected data generation section operable to calculate, as a dew-condensation determination corrected value, a difference in pixel value which represents the image brightness by a value ranging from 0 to a predetermined upper limit, between each pair of corresponding pixels in the dew-condensation determination data and the black reference data, to generate dew-condensation determination corrected data consisting of a plurality of the dew-condensation determination corrected values corresponding to the plurality of pixels, wherein the dew-condensation determination section to, based on a comparison between each of the plurality of dew-condensation determination corrected values corresponding to the plurality of pixels, and the dew-condensation determination threshold value, determine whether or not dew condensation occurs on the transparent member.

13. The method as defined in claim 12, wherein the dew-condensation determination section to, when, among the plurality of dew-condensation determination corrected values corresponding to the plurality of pixels, the number of dew-condensation determination corrected values each greater than the dew-condensation determination threshold value is equal to or greater than a predetermined reference value, determine that dew condensation occurs on the transparent member.

14. The method as defined in claim 12, wherein the image scanner further comprises:

a white reference member provided on the transparent member to serve as a white reference;

a white-corrected data generation section operable to cause the image scanning section to scan an image of the white reference member in the form of the plurality of pixels to thereby generate white reference data, and calculate, as a white-corrected value, a difference in the pixel value between each pair of corresponding pixels in the white reference data and the black reference data, to generate white-corrected data consisting of a plurality of the white-corrected values corresponding to the plurality of pixels; and a shading correction section operable to multiply a ratio of the dew-condensation determination corrected value to the white-corrected value for each pair of corresponding pixels in the dew-condensation determination corrected data and the white-corrected data, by the upper limit of the pixel value, to shading-correct the dew-condensation determination data (C), wherein the method comprises allowing the dew-condensation determination section to, based on a comparison between each of values indicated by the pixels in the shading-corrected dew-condensation determination data, and the dew-condensation determination threshold value, determine whether or not dew condensation occurs on the transparent member.

15. The method as defined in claim 11, wherein the image scanner further includes a scanning control section operable to cause the image scanning section to scan an image of a document in increments of one line in a main scanning direction (X-X), while relatively moving the image scanning section in an auxiliary scanning direction (Y-Y) with respect to the document, wherein the method comprises:

providing the dew-condensation determination member on the transparent member at a position offset in a direction opposite to a direction along which the image scanning section is moved according to the scanning control section, with respect to a position where the scanning of the document image by the image scanning section is started; and rendering the scanning control section to operate to, before causing the image scanning section to scan the document image, cause the dew-condensation determination section to perform the determination.

16. The method as defined in claim 12, wherein the image scanner further includes a scanning control section operable to cause the image scanning section to scan an image of a document in increments of one line in a main scanning direction (X-X), while relatively moving the image scanning section in an auxiliary scanning direction (Y-Y) with respect to the document, wherein the method comprises:
- providing the dew-condensation determination member on the transparent member at a position offset in a direction opposite to a direction along which the image scanning section is moved according to the scanning control section, with respect to a position where the scanning of the document image by the image scanning section is started; and
- allowing the scanning control section to operate to, before causing the image scanning section to scan the document image, cause the dew-condensation determination section to perform the determination.

17. The method as defined in claim 13, wherein the image scanner further includes a scanning control section operable to cause the image scanning section to scan an image of a document in increments of one line in a main scanning direction (X-X), while relatively moving the image scanning section in an auxiliary scanning direction (Y-Y) with respect to the document, wherein the method comprises:
- providing the dew-condensation determination member on the transparent member at a position offset in a direction opposite to a direction along which the image scanning section is moved according to the scanning control section, with respect to a position where the scanning of the document image by the image scanning section is started; and
- rendering the scanning control section to operate to, before causing the image scanning section to scan the document image, cause the dew-condensation determination section to perform the determination.

18. The method as defined in claim 14, wherein the image scanner further includes a scanning control section operable to cause the image scanning section to scan an image of a document in increments of one line in a main scanning direction, while relatively moving the image scanning section in an auxiliary scanning direction with respect to the document, wherein the method comprises:
- providing each of the white reference member and the dew-condensation determination member on the transparent member at a position offset in a direction opposite to a direction toward which the image scanning section is moved according to the scanning control section, with respect to a position where the scanning of the document image by the image scanning section is started; and
- rendering the scanning control section to operate to, before causing the image scanning section to scan the document image, cause the dew-condensation determination section to perform the determination.

* * * * *